Nov. 1, 1932.  A. F. McCOLLUM  1,885,124
SEWING MACHINE
Original Filed April 7, 1927  5 Sheets-Sheet 1
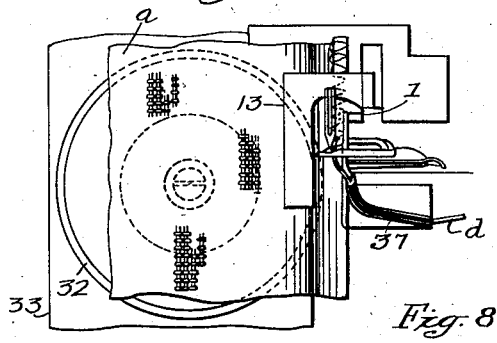
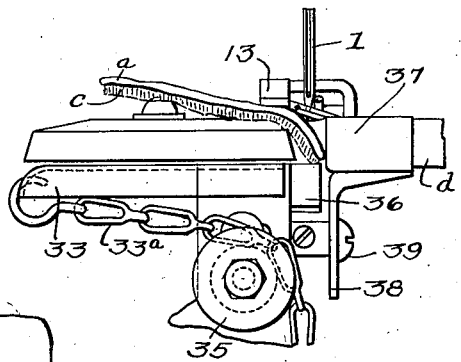
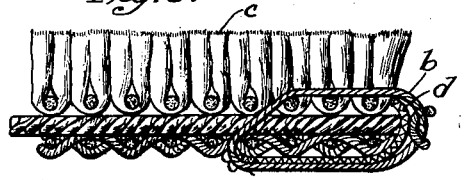
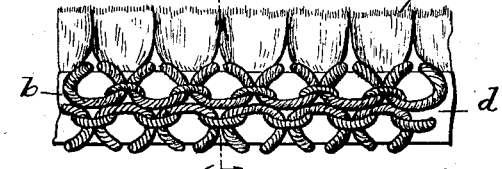
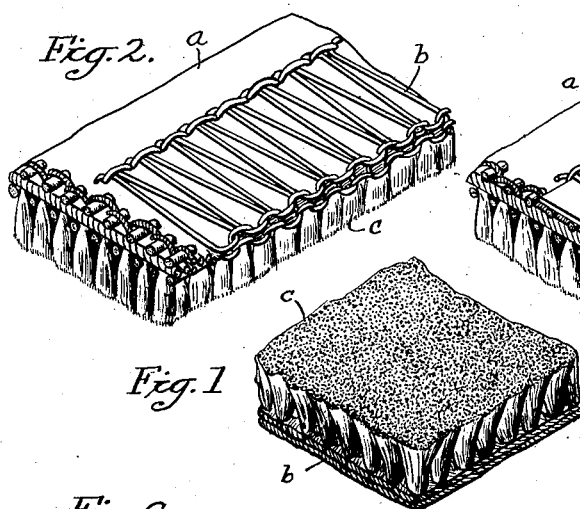
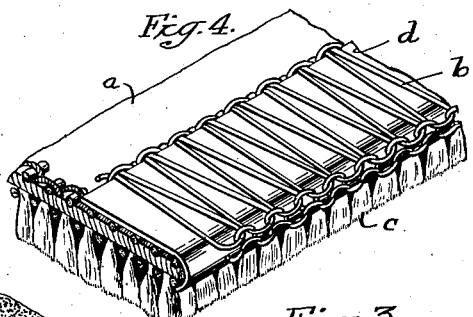
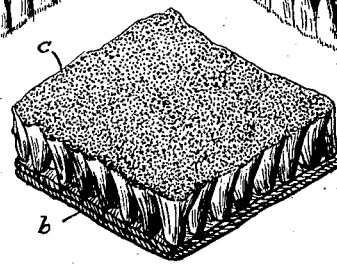
Inventor,
Alfred F. McCollum,
by his Attorneys,
Howson & Howson Nov. 1, 1932.  A. F. McCOLLUM  1,885,124
SEWING MACHINE
Original Filed April 7, 1927  5 Sheets-Sheet 2
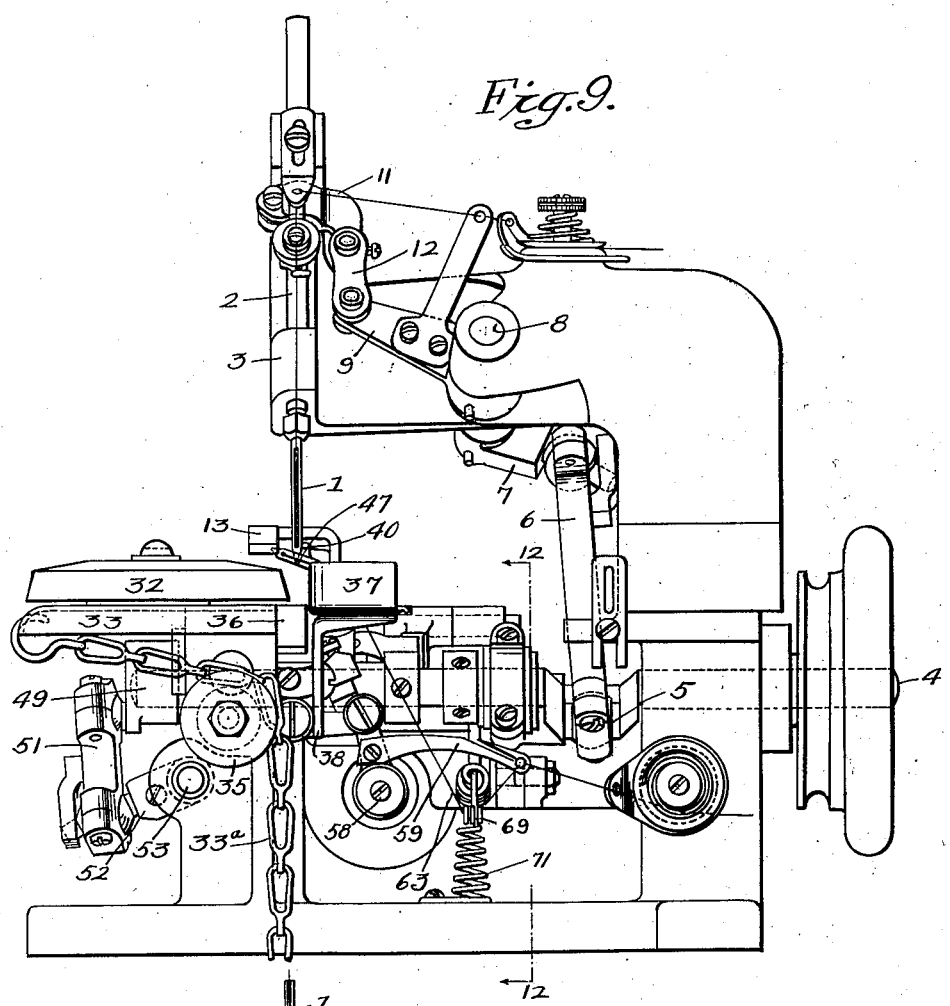
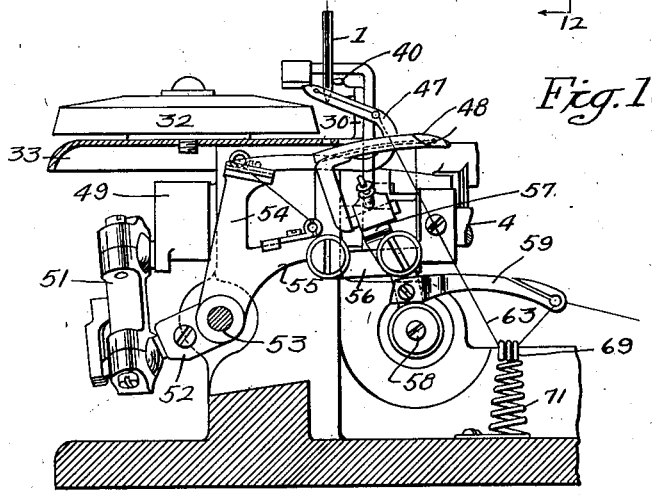
Inventor,
Alfred F. McCollum,
by his Attorneys, Nov. 1, 1932.  A. F. McCOLLUM  1,885,124
SEWING MACHINE
Original Filed April 7, 1927   5 Sheets-Sheet 3
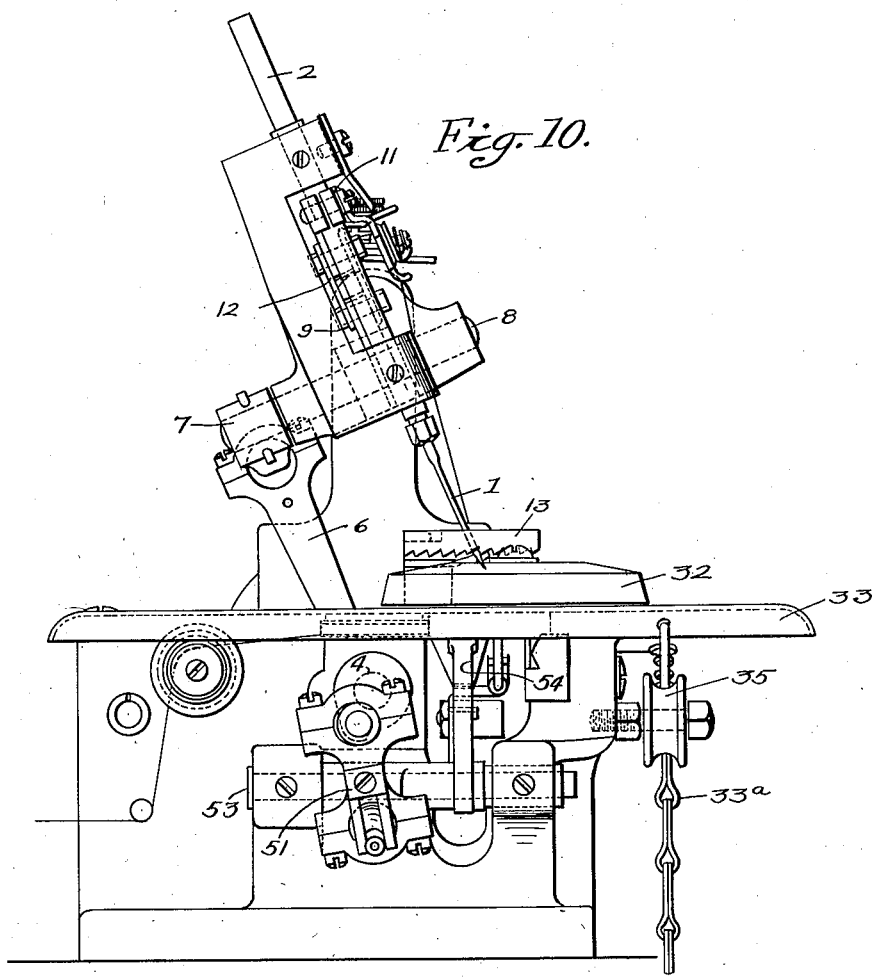
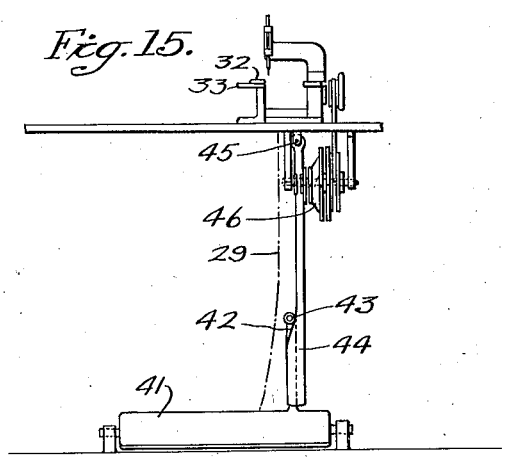
Inventor,
Alfred F. McCollum,
by his Attorneys,
Howson & Howson Nov. 1, 1932. A. F. McCOLLUM 1,885,124
SEWING MACHINE
Original Filed April 7, 1927   5 Sheets-Sheet 4

Inventor,
Alfred F. McCollum,
by his Attorneys,
Howson & Howson

Nov. 1, 1932.  A. F. McCOLLUM  1,885,124
SEWING MACHINE
Original Filed April 7, 1927   5 Sheets-Sheet 5

Inventor,
Alfred F. McCollum,
by his Attorneys,
Howson & Howson

Patented Nov. 1, 1932

1,885,124

UNITED STATES PATENT OFFICE

ALFRED F. McCOLLUM, OF BLOOMSBURG, PENNSYLVANIA, ASSIGNOR TO THE MAGEE CARPET CO., OF BLOOMSBURG, PENNSYLVANIA, A CORPORATION OF PENNSYLVANIA

SEWING MACHINE

Original application filed April 7, 1927, Serial No. 181,744. Divided and this application filed April 30, 1928. Serial No. 274,065.

My invention relates to improvements in machines for binding the edges of fabrics, and particularly the unselvaged edges of pile fabrics such as commonly used for floor coverings, and the principal object of my invention is to provide a machine for producing a novel and effective binding for the stated class of fabric which shall be unobtrusive in appearance and which shall leave the pile substantially unaffected and in the normal state to the extreme edge of the fabric.

Such a binding is illustrated and described in my copending application, Serial Number 181,744, filed April 7, 1927, of which the present application is a division.

In the attached drawings:

Figure 1 is a view in perspective of a fragment of carpet whose unselvaged edges are bound in accordance with the present invention;

Fig. 2 is an inverted perspective of a fragment, a portion of the unselvaged edge of which is bound in accordance with the present invention, the stitches in this illustration being somewhat exaggerated in order to make the character thereof clear;

Fig. 3 is a sectional view illustrating two pieces of carpet bound in accordance with the present invention and pieced together along their bound unselvaged edges;

Fig. 4 is a view similar to Fig. 2 showing a method of binding which includes a binding strip underlying and held in position by the binding;

Fig. 5 is an edge view of the bound fabric illustrated in Fig. 4;

Fig. 6 is a section on the line 6—6, Fig. 5;

Fig. 7 is a view of the reverse side of an outer corner of fabric bound in accordance with my invention;

Fig. 8 is a view showing the binding of an inside corner;

Fig. 9 is a front view of a sewing machine made in accordance with the present invention;

Fig. 10 is an end elevation of the machine;

Figs. 13 and 14 are fragmentary plan and elevational views respectively of portions of the mechanism illustrating the manner in which the fabric is fed to the needles;

Fig. 15 is a diagrammatic front elevation of the machine illustrating the controls;

Fig. 16 is a fragmentary sectional view illustrating details of the looper mechanism;

Figure 18:
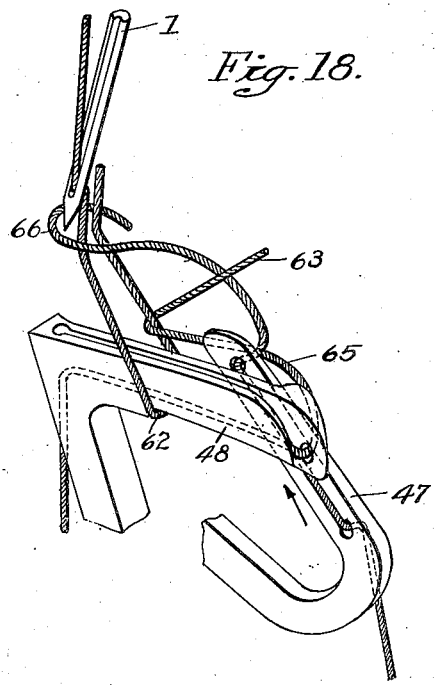

Referring to the drawings, and particularly to Figs. 1 to 6, inclusive, and Fig. 18, $a$ represents a piece of carpet whose unselvaged edges are bound in accordance with the present invention and wherein the binding is accomplished by means primarily of stitches $b$ made with suitable binding yarn and so formed as to be confined entirely to the body or base of the carpet beneath the pile $c$. In other words, instead of applying the stitches to the carpet edges in such manner as to cover a portion of the pile at the edge of the fabric after the usual manner, I so form the binding stitches as in no way to affect the normal appearance of the pile, which accordingly extends uninterruptedly to the extreme edge of the fabric.

An important novel characteristic of the present invention resides in the peculiar character of the stitch employed for the purpose which is such as to afford a bound edge which in all essential and desirable respects is the full equivalent of a normal selvaged edge. By my invention, not only is the unselvaged edge of the fabric closely and firmly bound so that no loose ends project or are visible, but the binding stitches may be made so compact and tight at the edges of the fabric that while covering and closely confining the said loose ends they are practically invisible to the casual observer and give the general appearance of a normal selvaged edge. Furthermore, the character of the binding stitches is such that a fabric having edges bound in accordance with my invention may be treated in all respects as a fabric whose edges are normally selvaged. As shown in Fig. 3 for example, pieces of fabric having unselvaged edges bound after the manner of my invention may be pieced together along these bound unselvaged edges in exactly the same manner and with the same general effect as though the edges were normally selvaged.

With reference to the aforesaid Figure 3, it will be noticed that by reason of the character of the binding, as previously stated and as well shown in Fig. 1, the pile extends uninterruptedly to the extreme edges of the fabric and even projects at the top as at a normally selvaged edge beyond the edge of the base fabric. When, therefore, the sections are joined together, the pile meets above the joint and effectively hides the latter so that the seam is as nearly invisible as a seam between normally selvaged fabrics.

The stitch lends itself readily to certain modified forms of binding, such for example as shown in Figs. 4, 5 and 6, in which the binding stitches $b$ are utilized not only to bind the unselvaged edges but to hold around the edge without piercing a binding strip $d$ which completely embraces and encloses the unselvaged edge, as clearly illustrated.

In order to more clearly describe the character of the stitch and the manner in which it is applied to the fabric, I have illustrated in Figs. 9 to 19 a machine constructed to apply the stitches at the unselvaged edges of the fabric in accordance with the present invention. This machine is of the general type known in the trade as a "serger" and utilizes a needle and a pair of loopers which cooperate with the needle to form the stitch. The needle 1 is carried by a reciprocatory needle bar 2 slidably supported in the frame 3 and reciprocated in the present instance from the main shaft 4 of the machine, this shaft having a crank 5 connected through a connecting rod 6 with an arm 7 at one end of a stub shaft 8 journaled in the frame, and the shaft 8 having an arm 9 connected through the medium of a link 12 with a cross head 11 on the needle bar 2. Under these circumstances, each rotation of the shaft 4 results in a complete reciprocation of the needle 1.

Figure 11:
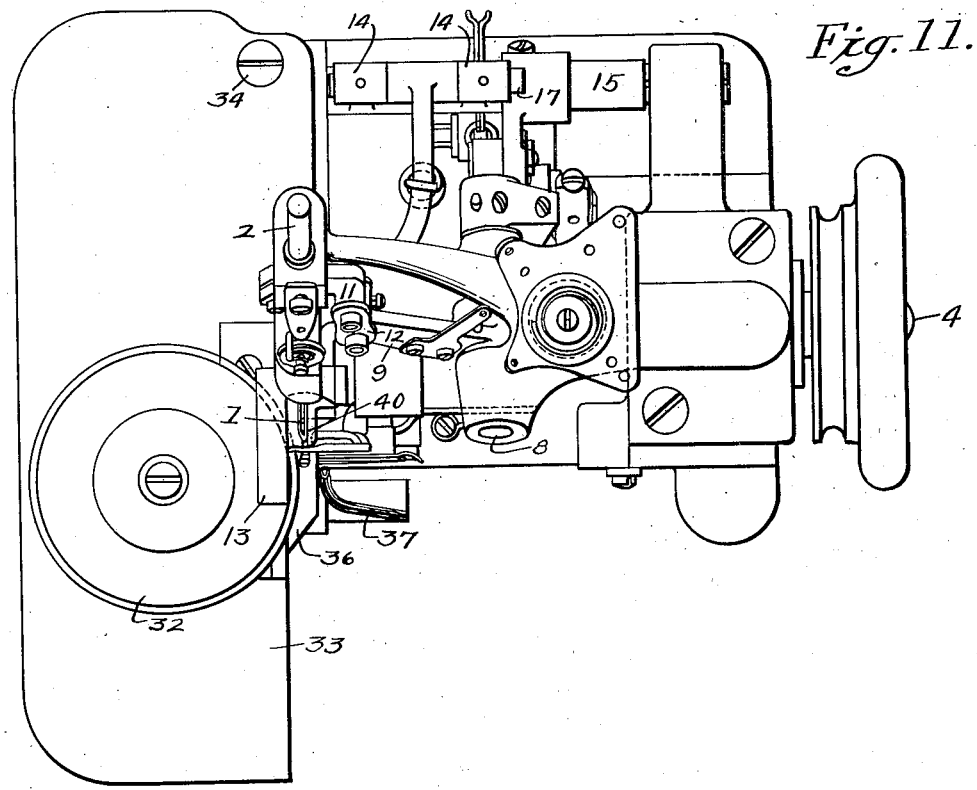
Fig. 11 is a plan view of the machine.
Figure 12:
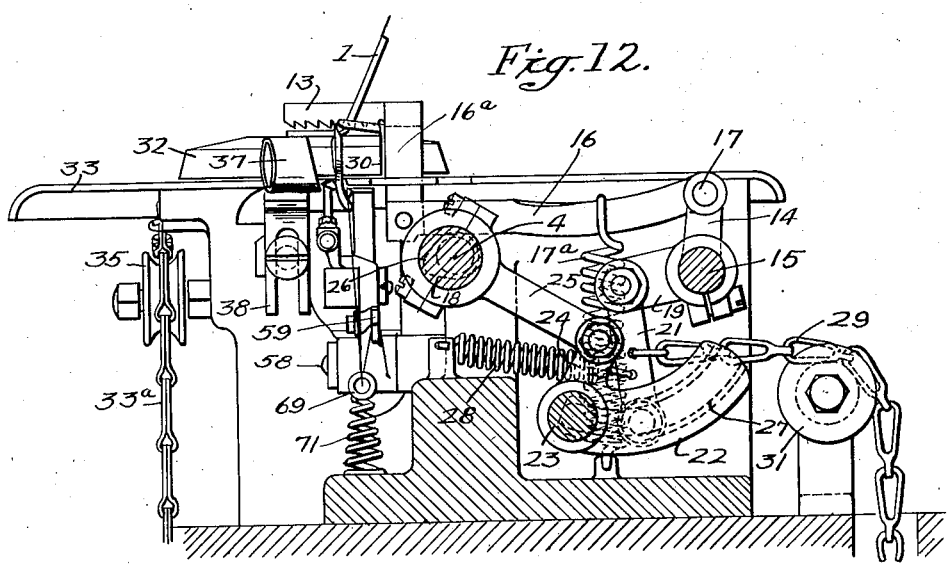
Fig. 12 is a section on the line 12—12, Fig. 9.

The fabric is advanced under the needle with the usual intermittent movement, but instead of, as usually, employing a feeding dog which engages the under side of the fabric, I accomplish the feeding of the fabric by means of a foot 13 which engages the top of the fabric as shown in Figs. 11 and 12, and by reason of its movement gives the fabric the desired intermittent advance movement. The feeding foot 13 receives its forward and rearward reciprocation from a crank 14 on a rock shaft 15, the foot 13 being carried upon an arm 16 which is pivotally secured to the two crank arms 14 through the medium of a pin 17. The forward end of the arm 16 rests upon a cam 18, shown in dotted lines in Fig. 12, on the main shaft 4 of the machine, which provides for periodic oscillation of the arm around the pivot pin 17. A spring 17a secured to the frame and to the arm 16 exerts a continuous pressure holding the arm in contact with the cam 18 and bringing the foot 13 into resilient contact with the fabric. The rock shaft 15 is operatively connected with the main shaft 4 of the machine through adjustable linkage providing for operation of the rock shaft 15 in timed relation with the action of the elevating cam 18 and providing also for an adjustment to regulate the throw of the crank 14 and thereby the feeding movement of the foot 13.

This linkage comprises an arm 19 on the rock shaft 15 connected through a link 21 with one arm 22 of a bell crank lever secured to a rock shaft 23 suitably journaled in the frame, the other arm 24 of the lever being connected through a rod 25 with an eccentric 26 on the shaft 4. As shown in Fig. 12, the arm 22 is formed on the arc of a circle the center of which corresponds approximately with the axis of the pivotal connection between the arms 19 and 21, and has a longitudinal slot in which the lower end of the link 21 is adjustably secured. The arrangement provides for adjustment of the lower end of the link 21 longitudinally of the arm 22, which varies the distance between the lower end of the link and the axis of the shaft 23 whereby the effective throw of the crank represented by the arm 22 may be varied from a practical zero when the lower end of the link 21 lies at the inner end of the slot 27 to a desirable maximum when the link is at the outer end of the slot. In practice, the connection between the link 21 and the arm 22 is a loose one permitting free movement of the connecting element in the slot 27, and a spring 28 is provided which tends to retain the link 21 at the inner end of the slot, in which position the feeding movement of the shoe 13 is reduced substantially to zero. The arm 21 has attached thereto a chain 29 which passes over a pulley 31 and is operatively connected with a foot pedal, whereby the feeding movement of the foot 13 may be regulated and varied as desired during the operation of the machine, as hereinafter set forth.

As shown in Figs. 13 and 14, the fabric is fed to the needle in an inverted position or with the pile down. Also the edge of the fabric which is presented to the needle is turned downwardly so that in extends at only a slight angle to the plane in which the needle operates. Under these circumstances, the needle after passing through the fabric travels on the piled side substantially parallel to the base and along the bottom of the pile so that the thread while embracing the edge of the base fabric does not extend over the tops of the pile, all as clearly illustrated in Figs. 1 to 6, inclusive.

In order to hold the fabric in proper position for presentation to the needle, I provide, as shown in Figs. 13 and 14, a rotary fabric-engaging element in the form of a disk 32 having slightly beveled edges, as shown, and mounted for rotation upon a table extension 33. This table is pivotally secured to the frame at the back of the machine by means of a set screw 34 which permits the table to be swung outwardly and horizontally away from the needle for adjustment purposes. The table has attached at the forward end thereof a chain 33a which passes over a grooved pulley 35 and provides means for retaining the table in a normal operative position. The chain 33a may have attached thereto a weight or a spring (not shown) to resiliently hold the disk 32 against the fabric, as shown in Fig. 12, with the required pressure, regardless of thickness of fabric. As shown in Fig. 14, the edge of the fabric is confined slightly in advance of the needle position in a shallow channel the bottom of which is formed by an element 36, constituting an extension of that portion of the frame which normally supports the inner edge of the table 33. One side of the channel is formed by a vertical guide element 37, which in its front portion curves away from the disk 32 and which is made hollow to function also as a guide for a binding tape d, as hereinafter described. The edge of the disk 32 constitutes the other wall of the channel, and the fabric accordingly is closely held between the disk 32, the element 36, the guide member 37 and the foot 13.

It will be apparent, as shown in Figs. 13 and 14, that the edge of the fabric is held firmly in proper position to receive the needle 1 as described above. The disk 32 in addition to functioning to clamp or hold the fabric firmly in the guide channel also functions as an abutment on the under side of the fabric for the feeding foot 13. As previously described, this foot receives a forward and rearward reciprocatory movement from the rock shaft 15 and at the same time is oscillated vertically through the medium of the cam 18. The relation of the movements of the shaft 15 and the cam 18 is such that the foot is elevated during the forward portion of its reciprocation, the foot moving downwardly at the forward end of its reciprocating stroke to engage the fabric and being elevated from the fabric at the rear end of the reciprocatory movement. During the rearward movement, therefore, the shoe carries with it the fabric, and this movement of the fabric is facilitated by the free rotation of the disk between which and the foot 13 the fabric is gripped.

By reference to Fig. 12, it will be noted that the foot 13 is connected to the forward end of the arm 16 by an upright part 16a. In order to prevent this part from chafing the edge of the fabric as it passes through the machine, I provide at the outer side thereof a fixed guard 30 which prevents the fabric edge coming into contact with the moving part 16a. The guard 30 also comprises an offset and forwardly projecting part 40 which lies close against the inside of the needle 1 and braces the needle against inward flexing due to the inclination of the fabric and the angular relation between the fabric and the needle.

For the purpose of binding the edges of fabric with the binding stitch at inturned corners or angles, the guide element 36 is curved downwardly at its forward edge, while the guide element 37, as previously described and as clearly illustrated, is curved away at its forward or outer end from the said element 36 and from the disk 32. This formation of the guide elements provides a curved corner close to the needle position around which the fabric may be fed from practically any angle to the needle. While the stitch is being applied at the angle, it is necessary that the normal feeding movement of the fabric be temporarily modified, and this is accomplished by means of the linkage previously described connecting the rock shaft 15 with the shaft 4. Release of the pressure from the chain 29 permits the spring 28 to pull the link inwardly until its lower end lies substantially concentric with the shaft 23, under which conditions the movement of the lever 22–24 is not transmitted to the shaft 15, and the latter accordingly remains practically stationary. This device may also be employed to regulate the length of the binding stitch or the number of stitches taken within any given space at the edge of the fabric, it being often desirable to use relatively close stitches adjacent the corners for reinforcing purposes.

This device for regulating the feed of the carpet, with the peculiar curved formation of the guides 36 and 37 described above, makes possible the serging or binding of square corners, either outside, as shown in Fig. 7, or inside as shown in Fig. 8 with a continuous series of stitches. In serging the outside corner the feed of the fabric is interrupted when the needle reaches the point 10, see Fig. 7, and the fabric is then turned around the needle so that the stitches radiate from a single point at the center of the corner, as illustrated. In serging the inside corner, as shown in Fig. 8, the fabric may be pivoted in the reverse direction by reason of the curved corner formed by the guides 36 and 37, as described, and the normal feed modified as required to give the desired result.

As previously described, the fabric guide 37 constitutes also a guideway for the binding strip d. This strip is passed through the guide element, as shown in Figs. 13 and 14, and as shown in the latter figure, the element 37, which is mounted on a bracket 38, is held to the frame by means of a set screw 39 and is vertically adjustable on the supporting structure. The guide accordingly may be adjusted to insure the needle 1 passing into the fabric at points beyond the edge of the binding strip d, as shown in Fig. 4. The binding strip d accordingly is not pierced by the needle but is none the less firmly held in place with one edge passing around the unselvaged edge of the base fabric, as shown in Figs. 4 and 6.

The operation of the machine, as shown in Fig. 15, is controlled through the medium of a treadle 41. This treadle has an arm 42, at the upper end of which is a roller 43 which operates against one edge of a lever 44 pivoted at its upper end at 45 to the frame or table of the machine. This lever is operatively connected with a clutch 46 which controls the transmission of power to the sewing machine. That face of the lever 44 which is engaged by the roller 43 is so formed that depression of the treadle from the normal inoperative position shown in Fig. 15 results in an immediate movement to the right of the lever 44, which in turn engages the elements of the clutch 46 and operatively connects the machine with the motor (not shown). The downward movement of the treadle 41 to fully engage the clutch 46 is a comparatively slight one as compared to the total possible movement, and the lower end of the lever 44 is so formed that after the clutch is once engaged, further downward movement of the treadle does not affect the clutch.

As previously stated, the chain 29 attached to the link 21 is also connected with the treadle 41, this chain being of such length that the link 21 is carried, for example, to a normal intermediate position on the arm 22 only after the pedal has been moved a predetermined extent beyond the point where the clutch is fully engaged. Under these circumstances, a further depression of the treadle results in the formation of a longer stitch due to the increased movement of the feeding shoe 13, while a partial release of the treadle from the aforesaid normal running position results in a reduction of the effective stroke of the feeding shoe 13 to any desired extent without affecting the clutch 46, which remains in engagement. In this manner, a single treadle is utilized not only to control the operation of the machine, but also to control the length of the stitch by regulating the effective stroke of the feeding shoe 13.

As stated above, the invention in one aspect resides largely in the character of the binding stitch. In forming the stitch, the needle 1 operates in conjunction with a pair of loopers 47 and 48, which I will term, respectively, upper and lower loopers. These loopers, as best shown in Fig. 16, are oscillated from the main shaft 4 of the machine through the medium of a crank 49 on the end of said shaft, which is connected through a link or rod 51 with an arm 52 on a rock shaft 53 suitably journaled in the frame. This rock shaft carries an arm 54 to which is secured the upper looper arm 47, and the arm 54 is further connected through a branch 55 and a link 56 pivotally connected therewith to a lever 57 which carries the lower looper 48. The lever 57 is pivotally secured at 58 to the frame, and carries a yarn take-up arm 59, through an eye in the outer end of which the yarn 63 passes to the looper 47. It will be apparent that rotation of the shaft 4 results in a related oscillation of the levers 54 and 57 and a corresponding predetermined relative movement of the loopers 47 and 48, the movement of the loopers being in predetermined timed relation to the movement of the needle 1.

It will be noted that the yarn 63 intermediate the arm 59 and the looper 47 passes through a guide eyelet 69 which is supported at the top of a resilient arm 71 in the form in the present instance of a coiled spring. This flexible guide has been found useful in eliminating breakage of the yarn resulting from the previous use of fixed guides at this point.

Figure 17:
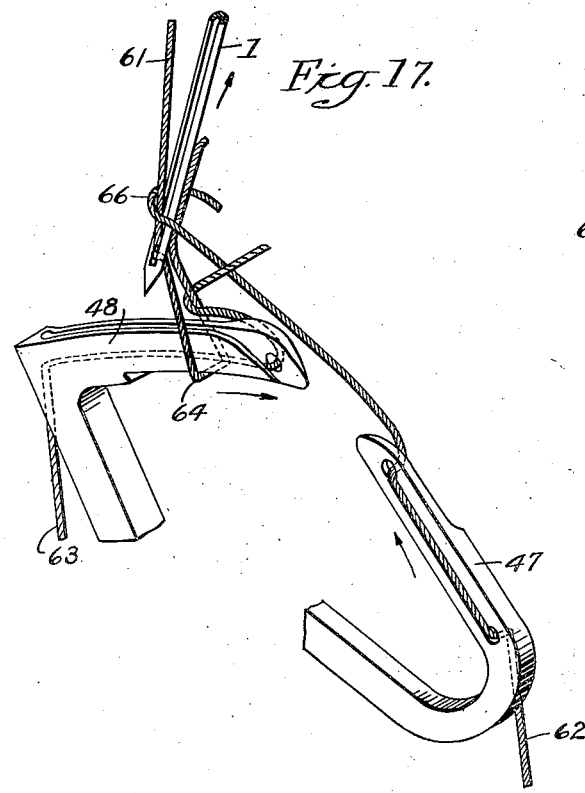
Figs. 17, 18 and 19, show progressive positions in the action of the needle and loopers in forming the binding stitch.

The relative movements of the needle 1 and of loopers 47 and 48 and the character of the resulting stitch are best illustrated in Figs. 17 to 20, inclusive. It will be noted that three independent yarns are involved in the production of the stitch; a needle yarn 61 carried by the needle 1, a looper yarn 63 carried by the looper 47, and a second looper yarn 62 carried by the looper 48. In Fig. 17, it may be assumed that the needle 1 is moving upwardly from its low position. At the low position, the looper 48 which operates underneath the fabric moves forward to take a loop 64 from the needle, and in Fig. 17, this loop is clearly shown. In Fig. 18, the looper 48 has moved still further forward, while the needle 1 is at or closely approaches the top of its stroke, and it will be noted that in this position the looper 47 has moved forward and has taken a loop 65 from the looper 48. Also in this position, a loop 66 which was previously taken from the looper 47 by the needle 1 is being cast by the needle.

Figure 19:
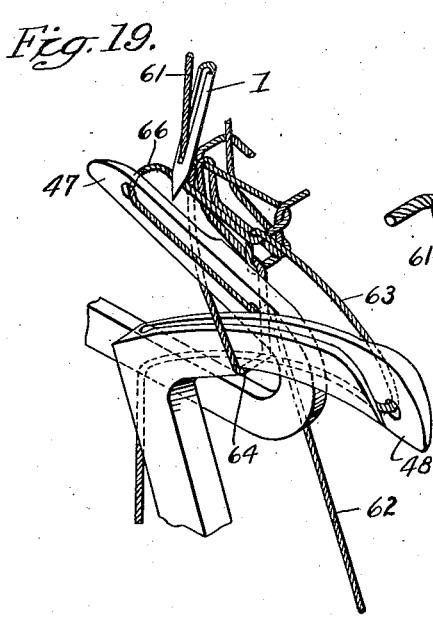
Figure 20:
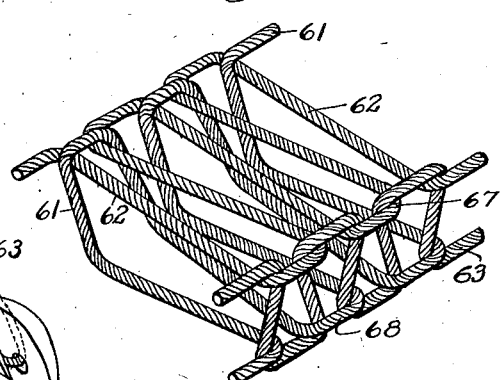
Fig. 20 is a diagrammatic view illustrating the character of the finished binding stitch.

In Fig. 19, the needle 1 is at the top of the stroke, while the loopers 47 and 48 have advanced to the extreme forward positions of their individual strokes, and it will be noted that in this position the needle 1 is about to move downwardly to take a loop, corresponding to the loop 66 previously taken, from the looper 47. In their retracted movements, the loopers 47 and 48 cast their respective loops in a manner that will be apparent, and the resulting stitch is illustrated in Fig. 20. In this stitch, the yarn 62 is laid upon the bottom face of the fabric to form a series of loops the closed ends 67 of which lie at the edge of the fabric, while the yarn 61 forms a corresponding series of loops 68 at the piled face of the fabric, it being kept in mind that the fabric passes through the machine in the inverted position. The needle yarn 61, however, in addition to forming the loop 68 passes through the fabric in a series of loops which bind down the yarn 62 at the inner ends of the aforesaid loops 67. The yarn 63, on the other hand, is intertwined with the loops 67 and 68, as clearly illustrated at the edge of the fabric in such manner as to complete the stitch by binding these free loops together.

It will be noted that the three yarns are united along a line directly over the unselvaged edge of the bound fabric and in such manner as to entirely cover and bind in the said edges and the loose ends thereof, as shown for example in Figs. 1 and 2. By adjusting the tension of the various yarns, the loops 67 and 68 may be more or less closely drawn together. Where a binding strip such as that designated d in Figs. 4, 5 and 6 is used, it is not essential that the loops 67 and 68 be so tightly drawn together, and it is sometimes desirable to leave them comparatively loose. Without the binding strip d, it is generally desirable to bind the edges closely and firmly with the yarn, and with the proper tension the loops 67 and 68 may be so closely bound together that the yarn 63 with the stitches at the bound edge of the fabric are so compact as to be practically invisible to the casual observer. The tight binding is particularly desirable where pieces of fabric are to be joined along the unselvaged bound edges, as shown in Fig. 3. In any event, it will be understood that the yarn 61 on the piled face of the fabric extends along the body of the fabric at the bottom of the pile, as shown in Figs. 3, 5 and 6, and is not only not visible at the top of the fabric but actually leaves the pile unaffected and in normal state completely to the edge of the fabric.

I claim:

1. In a sewing machine, the combination with a reciprocatory needle, of means for feeding a fabric to said needle including a guide adjacent the needle position and in which the fabric is supported in a plane substantially parallel to that in which the needle operates, and means for intermittently advancing said fabric with respect to the needle including a rotary member constituting an element of said guide underlying the fabric adjacent the needle position, and a reciprocatory feeding foot adapted to engage the upper side of the fabric above the said rotary element.

2. In a sewing machine, the combination with a vertically reciprocatory needle, of a guide slot adjacent the needle position in which the fabric is held for presentation to the needle in a substantially vertical position, and means including a rotary element underlying the fabric and forming a wall of said slot, and a reciprocatory feeding member adapted to engage the fabric above the rotary element for intermittently feeding the fabric past the needle position.

3. In a sewing machine, the combination with a reciprocatory needle, of a guideway adjacent the needle position in which the fabric is fed to the needle in a plane substantially paralleling the plane in which the needle operates, said guide comprising a relatively fixed bottom and side member and the other side of the guideway being constituted by a rotary element, and a reciprocatory feed element overlying the rotary element and adapted to engage the upper side of the fabric and to confine the fabric between itself and the said rotary element.

4. In a sewing machine, the combination with a reciprocatory needle, of means for feeding a fabric to the needle in a plane substantially parallel to the plane in which the needle operates, said feeding means including a rotary element engaging the under side of said fabric, and a reciprocatory feed element engaging the upper side of said fabric immediately above the said rotary element.

5. In a sewing machine, the combination with a reciprocatory needle, of means for feeding an edge of a fabric to the needle in a plane substantially parallel to the plane in which the needle operates, said feeding means including a guide slot adjacent the needle position including a base element and side abutting elements, one of said side elements being rotary in character and adjustable with respect to the other side element to vary the width of the slot, and a reciprocatory feeding foot in direct cooperative association with said rotary element for giving the fabric an intermittent movement past the needle.

6. In a sewing machine, the combination with a reciprocatory needle, of a guide slot adjacent the needle position in which a fabric is presented to the needle in a plane substantially parallel to the plane in which the needle operates, said slot being constituted by a pair of relatively movable opposed members, forming the sides of the slot, and a base member, one of said relatively movable side members being hollow and constituting a feed guide for a binding tape to be attached to the fabric by the sewed stitches.

7. In a sewing machine, the combination with a reciprocatory needle, of a guideway into which an entire edge portion of a fabric is adapted to be inserted and by which said edge portion is held in a plane substantially parallel to the plane in which said needle operates, and feed means for advancing the fabric in the guideway and including an element adapted to engage the fabric closely adjacent said guideway and at points in a direction longitudinally of the guideway at both sides of said needle.

8. In a sewing machine, the combination with a reciprocatory needle, of a guideway into which an entire edge portion of a fabric is adapted to be inserted and by which said edge portion is held in a plane substantially parallel to the plane in which said needle operates, means for supporting the fabric at the side of said guideway, and feed means cooperative with said support means to confine the fabric immediately adjacent the side of said guideway and at points at both sides of the needle in a direction longitudinally of said guideway.

9. In a sewing machine, the combination with a guideway, of a needle operative therein, said guideway being adapted for reception of an entire edge portion of a fabric and to support said fabric in a plane substantially parallel to the plane in which said needle operates, and means for advancing the fabric in the guideway including elements adapted to grip the fabric at a plurality of points immediately adjacent the needle at one side of said guideway and at both sides of the needle in a direction longitudinally of the guideway.

ALFRED F. McCOLLUM.